US 6,676,133 B2

(12) United States Patent
Obermaier et al.

(10) Patent No.: US 6,676,133 B2
(45) Date of Patent: Jan. 13, 2004

(54) CYLINDER HEAD GASKET

(75) Inventors: Stefan Obermaier, Stadtbergen (DE); Josef Ludwig, Niederstotzingen (DE); Gunther Unseld, Neenstetten (DE)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/992,380

(22) Filed: Nov. 19, 2001

(65) Prior Publication Data

US 2003/0155719 A1 Aug. 21, 2003

(30) Foreign Application Priority Data

Nov. 15, 2000 (DE) .......................... 200 19 412

(51) Int. Cl.[7] .............................................. F02F 11/00
(52) U.S. Cl. .................. 277/593; 277/591; 277/594; 277/598
(58) Field of Search ................ 277/591, 593, 277/594, 598

(56) References Cited

U.S. PATENT DOCUMENTS

| | | | | |
|---|---|---|---|---|
| 5,628,518 A | * | 5/1997 | Ushio et al. ................. | 277/593 |
| 5,842,702 A | * | 12/1998 | Udagawa .................... | 277/593 |
| 5,927,724 A | * | 7/1999 | Maschmann et al. ........ | 277/593 |
| 5,979,906 A | * | 11/1999 | Silvian ........................ | 277/593 |
| 6,113,110 A | * | 9/2000 | Hasegawa .................... | 277/593 |
| 6,135,459 A | * | 10/2000 | Hiramatsu et al. .......... | 277/593 |
| 6,164,662 A | * | 12/2000 | Uemura et al. .............. | 277/593 |
| 6,206,381 B1 | * | 3/2001 | Ii et al. ....................... | 277/593 |
| 6,299,175 B1 | * | 10/2001 | Maekawa et al. ........... | 277/593 |
| 6,422,572 B1 | * | 7/2002 | Ueda et al. .................. | 277/591 |
| 6,450,504 B2 | * | 9/2002 | Bleidt et al. ................. | 277/592 |

FOREIGN PATENT DOCUMENTS

DE 195 15 329 C 1 4/1995

* cited by examiner

Primary Examiner—Anthony Knight
Assistant Examiner—Enoch E Peavey
(74) Attorney, Agent, or Firm—Rader, Fishman & Grauer PLLC

(57) ABSTRACT

The invention pertains to a cylinder head gasket (1) for sealing a region between the cylinder head and the cylinder block of a combustion engine, comprising at least one sealing plate (2) that features several adjacent combustion chamber passages (3, 4) and a corresponding combustion chamber bead (5) running around the combustion chamber passage (3), wherein there is a stopper (6) that acts as a displacement limiter for the combustion chamber bead, wherein the stopper is interrupted in the region (10) between two combustion chamber passages (3, 4) and extends essentially over the entire area of the sealing plate (2) where there are no openings.

10 Claims, 4 Drawing Sheets

CYLINDER HEAD GASKET

Figure 1:
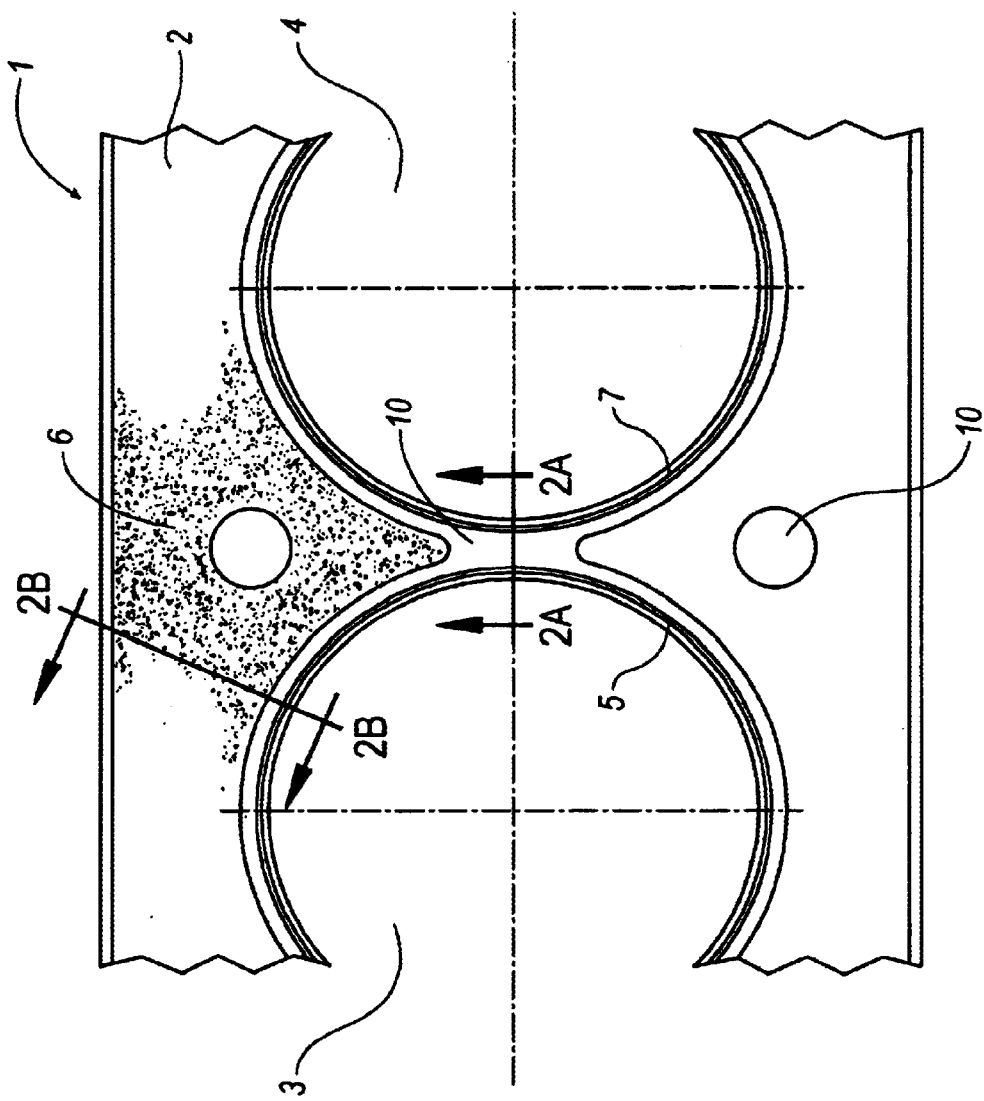

The present invention pertains to a cylinder head gasket according to the preamble of Claim 1.

In principle, two combustion chamber gasket concepts are possible for cylinder head gaskets that are built out of several layers of steel. For both, it is common for the sealing of the combustion chamber passage to be accomplished by a combustion chamber bead running essentially along the edge of the combustion chamber passage. By pressing the cylinder head against the cylinder head gasket and the underlying cylinder block, the combustion chamber bead can be compressed, thereby guaranteeing its sealing function. It is possible for the combustion chamber bead deformed under this pressure to provide a combustion chamber bead support, a so-called stopper. This construction guarantees that when power is shunted, the combustion chamber bead is compressed and the combustion chamber bead cannot become flattened, as with variants without a stopper.

DE 195 15 329 C1 discloses a cylinder head gasket, which in one embodiment features a sealing plate that features several combustion chamber passages arranged adjacent to each other. Around each combustion chamber passage there is a combustion chamber bead, wherein on the side of the combustion chamber bead facing away from the combustion chamber passage there is a stopper that is adjacent to the side of the combustion chamber bead. The individual combustion chamber passages are separated by only a very small distance, so that the stopper is interrupted in the connecting region between two adjacent combustion chamber passages. The stopper only extends a small amount in the lateral direction, so that for a two-cylinder series motor, the stopper has the form of "eyeglasses."

The device according to the prior art has the disadvantage that the device is only supported in the region directly around the combustion chamber bead, while other beads, for instance, a half-bead located at the edge, can become flattened. If beads are supported on one side in a single cylinder head gasket other beads, which, however, are also dependent on support, are not thusly supported, so that the cylinder head gasket loses its elastic deformability, which can lead to reduced seeing characteristics or to deformation of adjacent components.

The objective of the present invention is to overcome the disadvantages of the state of the art mentioned above.

This objective is realized by the cylinder head gasket according to Claim 1. Here, because the stopper essentially extends across the entire surface of the sealing plate where there are no openings, beads that are not combustion chamber beads are also supported by the stopper which protects the combustion chamber bead. Thus, combustion chamber beads, beads around the passages, as well as edge beads can be protected by a single stopper. In this way, the expense of construction or assembly of the cylinder head gasket can be considerably reduced.

Advantageous refinements of the present invention are given in the subordinate claims.

The configuration of the stopper can be chosen arbitrarily. Thus, for instance, it is also possible to provide a stopper that is integrated into the sealing plate. Here, the stopper is formed from an increase in thickness of the sealing plate. However, it is also possible to provide separate stopper elements. An especially cost-effective variant configures the stopper with an essentially constant thickness at the side of the stopper plate adjacent to the combustion chamber bead.

In another advantageous embodiment, the cylinder block features cylinder liners. Cylinder blocks in modern combustion engines are often built from several parts, wherein cast iron cylinder liners are molded or inserted into an aluminum base block. These multiple parts can lead to displacements of the cylinder liners in the aluminum base block. Thus, one goal is to achieve an optimum sealing effect in the region between the cylinder head and the cylinder block on the one hand, while preventing the vertical pressure from building up too high on the cylinder liner on the other. It is possible to arrange the deformable combustion chamber bead directly at the edge of the combustion chamber passage and to arrange the stopper on the side of the combustion chamber bead facing away from the combustion chamber passage, so that for maximum possible joining pressures of the cylinder head gasket, the deformation by the section of the stopper between the cylinder base block and the cylinder head is limited and does not load only the cylinder liner.

Additional advantageous embodiments are given in the subordinate claims.

Figure 2A:
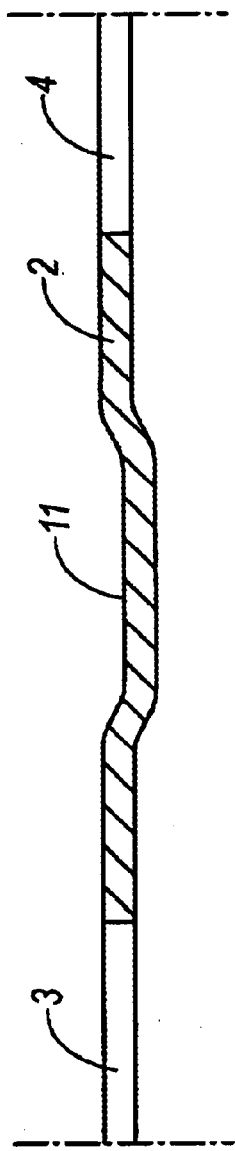
Figure 2B:
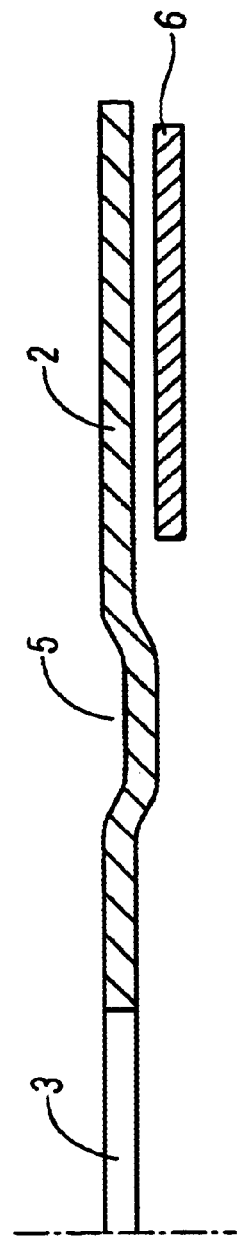
Figure 3:
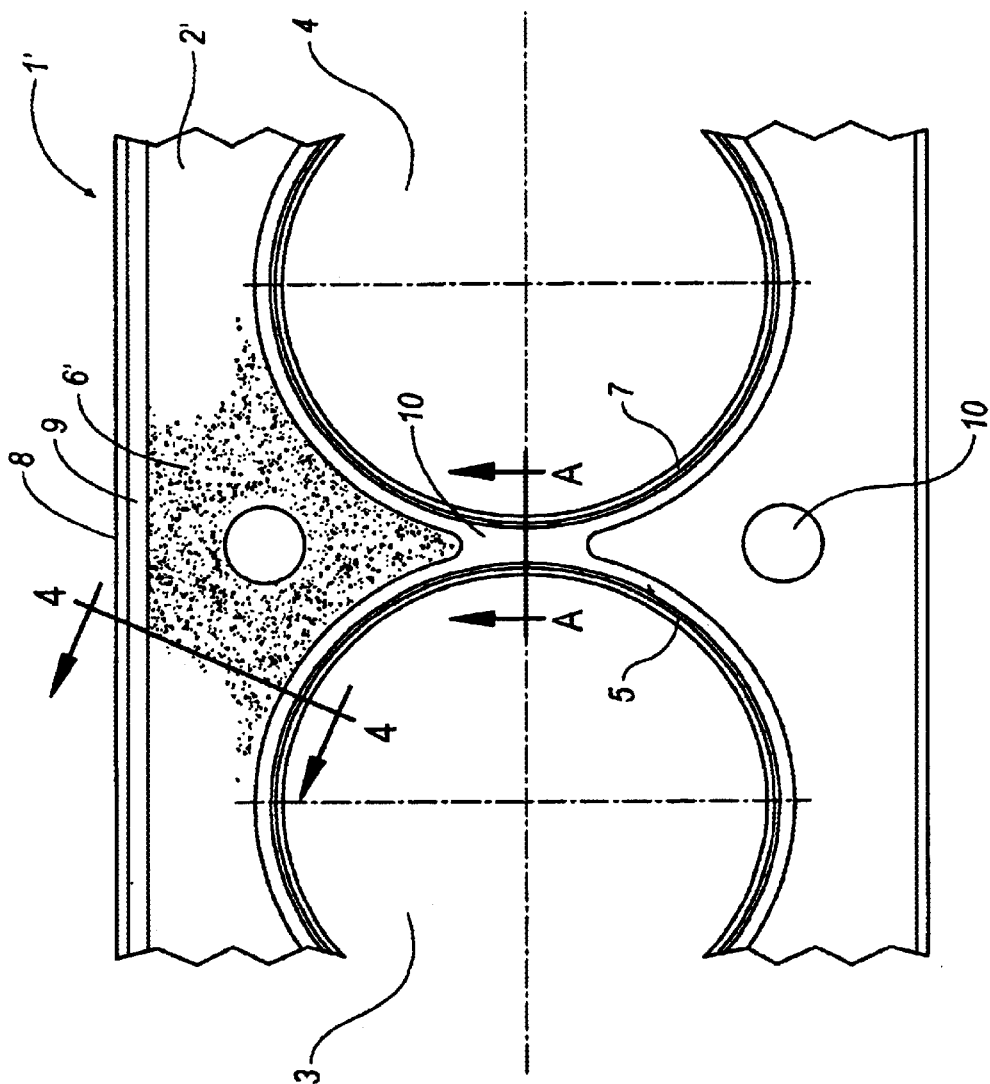

The invention is now explained with reference to several drawings. Shown are:

FIG. 1, a section of a cylinder head gasket according to the invention,

FIGS. 2a and 2b, sectional representations relative to FIG. 1,

FIG. 3, a variant of a cylinder head gasket according to FIG. 1, and

Figure 4:
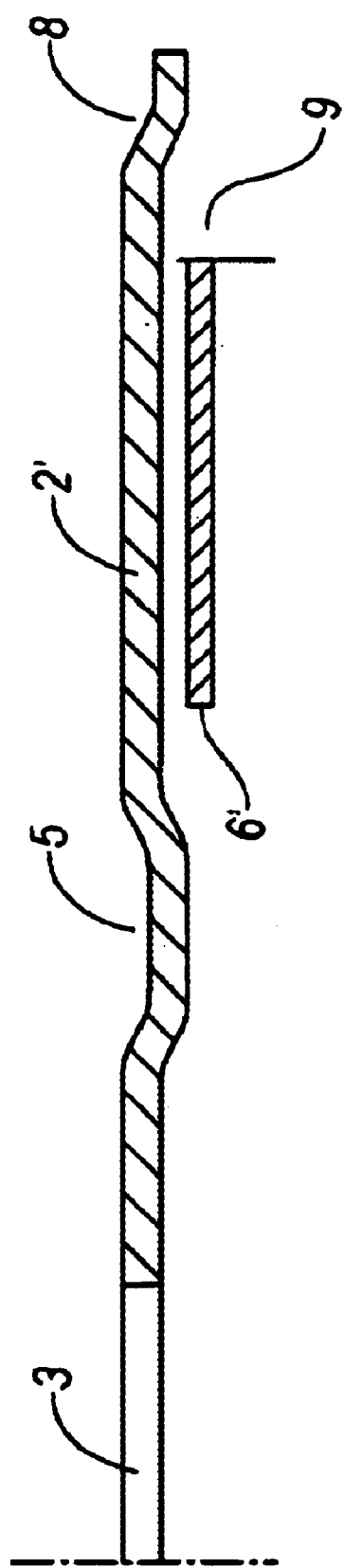

FIG. 4, a sectional representation of the cylinder head gasket from FIG. 3 along C'—C'.

FIG. 1 shows a section from a cylinder head gasket 1 according to the invention. This gasket features a sealing plate 2 which has two adjacent combustion chamber passages 3 and 4. Around the combustion chamber passage 3 there is a combustion chamber bead 5 which is separated by a small distance and which is formed as a full bead. Correspondingly, a combustion chamber bead 7 is arranged around the combustion chamber passage 4. There is a stopper 6 on the side of the combustion chamber bead 5 facing away from the combustion chamber passage 3, which serves as a displacement limiter for the combustion chamber bead 5 in the direction perpendicular to the plane of the paper. The stopper 6 is also arranged correspondingly around the combustion chamber bead 7. This stopper extends essentially over the entire region of the sealing plate 2 where there are no openings. Near the combustion chamber passages, there are, e.g., threaded openings 10 for the passage of cylinder-head screws or for openings that are not shown for the supply or discharge of oil or water.

The sectional representations from FIGS. 2a and 2b illustrate the structure of the cylinder head gasket, which is designed as a multilayer steel gasket (MLS), and which contains a sealing layer 2 designed as a beaded spring plate layer, as well as a stopper 6 designed as a stopper plate with essentially constant thickness.

FIG. 2a shows a variant of the bead arrangement in the region between the combustion chamber openings 3 and 4 in the section directed along A—A. In FIG. 1, the combustion chamber beads 5 and 7 are individually realized as independent, closed, full beads. Section A—A would show the cross section of two full beads with an unbeaded connecting piece lying between. For a very small distance between the combustion chamber passages 3 and 4, which is often the case for modern passenger car engines, it is possible to combine the otherwise separated combustion chamber beads 5 and 7 in the region between the combustion chamber openings 10 into a single full bead 11, which can be see in the section A—A in the variants shown in FIG. 2a.

The design of the cylinder head gasket from sealing layer 2 as well as stopper 6 is illustrated especially in FIG. 2b, which shows section C—C. On the side of the combustion chamber bead 5 radially outside of or facing away from the combustion chamber passage 3, the stopper is arranged with an essentially constant thickness at the side of stopper plate 6 adjacent to the combustion chamber bead embossment. The thickness of the stopper plate 6 is chosen so that it is somewhat less thick than the greatest bead height relative to the unbeaded region of the sealing plate 2 in the undeformed state of the sealing plate.

The variant realized in FIG. 2b deals with a separate stopper. By providing a separate stopper, i.e., which is unlike the sealing plate 2, the sealing plate 2 may make contact with a separator plate that is connected essentially flush with the side of the sealing plate, i.e., which extends up to the combustion chamber passage, the stopper being configured as an increase in the thickness of the separator plate relative to the combustion chamber passage located radially outside of the combustion chamber bead. However, it may also be advantageous to integrate the stopper in the sealing plate, i.e., since the stopper is configured as an increase in thickness of the sealing plate 2.

The design of gaskets for passages that are not shown for fluid media, such as oil or water, is possible corresponding to the structure shown in FIG. 2b. Here, there can also be a surrounding full- or half-bead in the region around the passage and the stopper plate 6 can be arranged on the side of the bead facing away from the passage. Here, it is advantageous for a separating region to be maintained between the bead and the stopper plate. On the one hand, this prevents damage to the bead by the stopper plate 6, and on the other, it guarantees a sufficient support of the bead (protection against flattening pressures). Obviously, it is also possible to use other gasket concepts in the region around the passages; for instance, to arrange additional sealing elements made out of an elastomer around the passage.

FIG. 3 shows a wall 1' of the cylinder head gasket 1 from FIG. 1. By means of this part, the stopper plate 6 is arranged at a greater distance from the edge of the sealing plate 2'.

The exact design of this arrangement can be seen in FIG. 4, which shows a section along C'—C' of the cylinder bead gasket 1' from FIG. 3. Between the lateral outer edge of the stopper 6' and the outer edge of the sealing plate 2' there is a separating groove 9 which acts as protection for the half-bead 8 of the sealing plate 2' located at the edge. Thus, it is possible to protect both the combustion chamber bead 5 and also the edge bead 8 against flattening pressures from strong vertical forces on the cylinder had gasket with a single stopper 6'.

What is claimed is:

1. A cylinder head gasket for sealing a region between a cylinder head and a cylinder block of a combustion engine, comprising:

at least one sealing plate with at least two combustion chamber passages arranged next to each other and a corresponding combustion chamber bead enclosing each of the combustion chamber passages, and a displacement limiter, wherein the displacement limiter extends substantially over an entire surface of the at least one sealing plate not enclosed by the combustion chamber beads and wherein the displacement limiter is interrupted in a region between the combustion chamber passages.

2. The gasket of claim 1, wherein the displacement limiter is formed from an increase in thickness of the at least one sealing plate.

3. The gasket of claim 1, wherein the displacement limiter is formed with a constant thickness.

4. The gasket of claim 1, wherein the displacement limiter is formed from a separate plate attached to the at least one sealing plate.

5. The gasket of claim 1, wherein the at least one sealing plate includes at least one fluid media passage and a bead enclosing each passage.

6. The gasket of claim 1, further including a separating region between the combustion chamber bead and the displacement limiter.

7. The gasket of claim 1, wherein the at least one sealing plate includes an edge bead.

8. The gasket of claim 7, further including a separating groove between the displacement limiter and the edge bead.

9. The gasket of claim 1, wherein the cylinder block including cylinder liners.

10. The gasket of claim 1, wherein the at least one sealing plate and the displacement limiter form a multilayer steel gasket, wherein the at least one sealing plate is a beaded spring plate layer and wherein the displacement limiter is a constant thickness.

* * * * *